G. G. B. TARTARA.
PHOTOGRAPHIC AND CINEMATOGRAPHIC APPARATUS.
APPLICATION FILED DEC. 29, 1919.
1,407,357.
Patented Feb. 21, 1922.
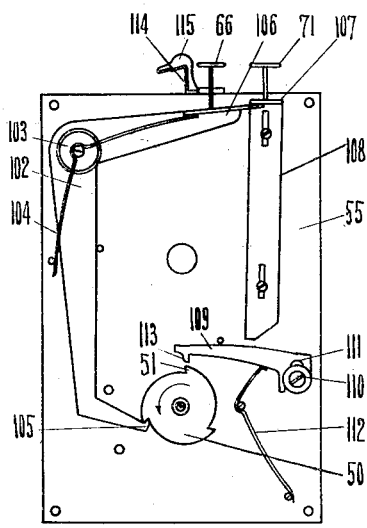
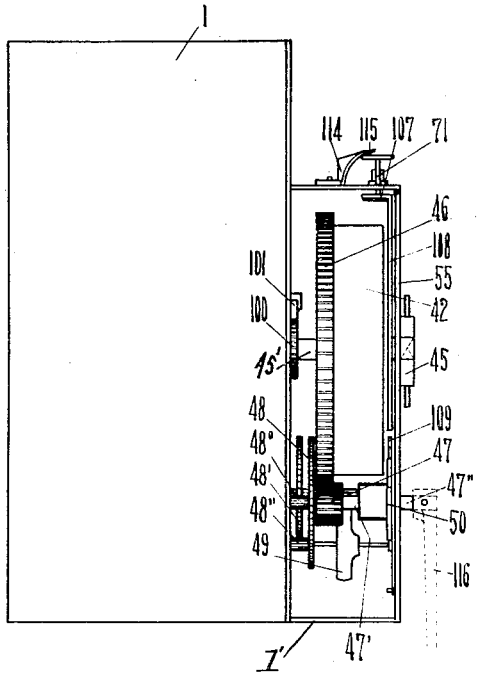
Inventor:
G. G. B. Tartara,
By
Attorney.

UNITED STATES PATENT OFFICE.

GIUSEPPE GIOVANNI BATTISTA TARTARA, OF TURIN, ITALY.

PHOTOGRAPHIC AND CINEMATOGRAPHIC APPARATUS.

1,407,357.  Specification of Letters Patent.  Patented Feb. 21, 1922.

Application filed December 29, 1919. Serial No. 347,896.

*To all whom it may concern:*

Be it known that I, GIUSEPPE GIOVANNI BATTISTA TARTARA, a subject of the King of Italy, residing at Turin, Italy, have invented certain new and useful Improvements in Photographic and Cinematographic Apparatus, of which the following is a specification.

This invention relates to apparatus for taking at will either photographic or cinematographic views and comprises a camera having means for supporting, exposing and feeding the film step by step as well as a motor for driving said feeding mechanism, of the kind described in the United States Patent No. 1,295,081, dated Feb. 18, 1919.

This invention has for its object a device for controlling said motor in order to obtain at will either a continuous operation of the camera for taking cinematographic views, or the operation of the camera only so long as required for the purpose of taking a single photograph.

Other features of this invention will be clearly disclosed by the following specification in connection with annexed drawings.

On the annexed drawings, Figure 1 is a side view of the apparatus with the face wall of the motor casing removed for the purpose of showing the internal parts and Figure 2 is a front view of the motor controlling device.

As shown by Figure 1, the apparatus comprises a camera 1 having means such as disclosed in said patent for supporting, exposing and feeding the film step by step and a casing 1' which is connected together with said camera and encloses the motor and the controlling parts for the same.

Said motor comprises a drum 42 enclosing a spiral spring which may be wound up by means of the key 45; the spindle 45' which is fixed to key 45 and to one end of the spring, is provided with a ratchet wheel 100 locked by a pawl 101.

Drum 42 is provided with a toothed rim 46 meshing with a pinion 47 fast on shaft 47' which drives the devices enclosed within the camera 1 and carries a pinion 48 operating the wing-governor 49 by the intermediate gears 48°, 48' and 48''.

On shaft 47' is further keyed the part 50 adjacent to front wall 55 of casing 1'; according to this invention this part consists of a disk having teeth 51 adapted to be engaged by the controlling members as hereinafter described. Said teeth may have the serrated or ratchet shape shown on the drawing.

Said controlling members comprise a crank lever 102, pivoted at 103 on the casing wall 55, which is held by a spring 104 in such a position as to have its end hook 105 in engagement with one of teeth 51 of disk 50. The end 106 of the other arm of said lever 102 is engaged by an upturned portion 107 of a plunger 108 mounted on the casing wall 55 in such a manner as to reciprocate endwise along the same. In front of and slightly spaced apart from the end of said plunger 108 opposite to said upturned portion 107, is located a lever 109 having a slot 111 engaged by a pin 110 secured to wall 55, so that said lever 109 may move freely with regard to said pin 110 and the casing wall 55. Said lever 109 has an end projection 113 adapted to engage the teeth of disk 50 and is held by a spring 112 in its position removed from said disk so as to have its projection 113 out of the path of the teeth 51 of said disk.

The arm 106 of lever 102 and the upturned end 107 of plunger 108 are located under the control of push buttons 66 and 71 respectively and the respective positions of hook 105 and projection 113 of arm 102 and lever 109 respectively are such that said hook and projection are in register with two subsequent teeth of disk 50.

The operation of the described controlling device is as follows: When button 66 is pushed down the lever 102 is shifted, the plunger 108 being on the contrary unaffected because the end of arm 106 is engaged under the upturned end 107 of said plunger and may move freely downward with respect to the same; therefore hook 105 releases the teeth of disk 50 and the motor is free to drive in a continuous manner the feeding device of the camera until button 66 is released, this releasing of said button restoring the parts in engaging position owing to spring 104 which carries lever 102 into its normal position with the hook 105 engaged with one of the teeth 51 of disk 50. In this manner a cinematographic view may be taken, the devices of the camera being operated in a continuous manner as above described.

On the contrary when button 71 is shifted, the plunger 108 is moved with its upturned portion 107 which drives the arm 106 so as to cause the hook 105 of lever 102 to release the tooth 51 of disk 50 engaged by it; but a short time after said tooth has thus been released, that is after plunger 108 has moved to the extent of the free space between its lower end and lever 109, said lower end of plunger 108 engages lever 109 and carries its projection 113 into the path of teeth 51 of disk 50 so as to engage the tooth subsequent to that which was previously in register with projection 113.

On button 71 being released, the lever 102 is again allowed to engage the disk 50 by its tooth 105 and thereafter the lever 109 is released to remove its projection 113 from the path of teeth 51 so that the motor is held stopped.

By the described operation the motor is allowed to operate during a time corresponding with that of the motion of disk 50 through the angle enclosed between two subseqent teeth 51; obviously the space between these teeth 51 and the ratio of the gear must be suitably designed so as to allow the operation of the camera for taking a single photograph during said time.

The described construction prevents the disk 50 from being engaged by the projection 113 before the disk and motor are started and therefore it is not required to provide particular means for this purpose; at the same time owing to the shape of teeth 51 any friction between projection 113 and the rim of disk 50 is prevented before said projection engages the teeth of said disk.

In order to avoid the necessity for holding the button 66 pushed down by the finger when a cinematographic view must be taken, on the upper wall of the motor casing is pivoted a rotatable catch 114 having a sloping surface 115 which may be carried into engagement with the button 66 to hold the same down.

For allowing of driving the camera devices by hand when required, say for the purpose of printing positive films by means of the same camera, and in view of the fact that the motor casing is secured to the camera as above stated, the shaft 47' driving said camera devices is provided with an extension 47" projecting to the outside of the motor casing and adapted to receive and be connected with a handle 116 as shown by dotted lines on the drawing.

For the hand operation the catch 114 must be carried into engagement with button 66 to hold hook 105 disengaged from disk 50 while said handle 116 is being operated.

What I claim as my invention and desire to secure by United States Letters Patent is:—

1. A controlling device for spring motors comprising a member driven by the motor, a plurality of engaging means provided on said member around its centre and spaced to a constant angular distance from each other, a locking part normally in engagement with one of said engaging means, a hand operated member for releasing said part from said engaging means, a stopping part adapted to engage said engaging means, means for keeping this stopping part released from said engaging means and a second hand operated member cooperating with said locking and stopping parts for releasing said locking part from said engaging means and for carrying said stopping part across the path of said engaging means.

2. A controlling device for spring motors comprising a member driven by the motor, a plurality of engaging means provided on said member around its centre and spaced to a constant angular distance from each other, a locking arm normally engaging one of said engaging means, a hand operated member for releasing said locking arm from said engaging means, a stopping arm adapted to engage said engaging means, means keeping this stopping arm released from said engaging means and in register with one of them and a second hand operated member cooperating with both said arms for releasing said locking arm from said engaging means and for carrying said stopping arm into engagement with the engaging means following that which was in register with the same arm.

3. A controlling device for spring motors comprising a member driven by the motor, a plurality of engaging means provided on said member around its centre and spaced to a constant angular distance from each other, a locking arm normally engaging one of said engaging means, a hand operated member for releasing said locking arm from said engaging means, a stopping arm adapted to engage said engaging means, means for keeping this stopping arm released from said engaging means and in register with one of them and a second hand operated member acting directly on said locking arm for releasing it from the cooperating engaging means, this hand operated member acting with lost motion on said stopping arm to carry it across the path of said engaging means.

4. A controlling device for spring motors comprising a member driven by the motor, a plurality of engaging means provided on said member around its centre and spaced to a constant angular distance from each other, a locking part normally in engagement with one of said engaging means, a hand operated member for releasing said part from said engaging means, a stopping part adapted to engage said engaging means, means for keeping this stopping part released from said engaging means, a second hand operated member cooperating with said locking and stopping parts for releasing said locking part from said engaging means and for carrying said stopping part across the path of said engaging means, and means for keeping the first hand operated member and cooperating locking part in released position with regard to said engaging means.

5. A controlling device for spring motors, comprising a member driven by the motor, a plurality of engaging means provided on said member around its centre and spaced to a constant angular distance from each other, a locking part normally in engagement with one of said engaging means, a hand operated member for releasing said part from said engaging means, a stopping part adapted to engage said engaging means, means for keeping this stopping part released from said engaging means, a second hand operated member cooperating with said locking and stopping parts for releasing said locking part from said engaging means and for carrying said stopping part across the path of said engaging means, said motor driven member having a protruding stud for engagement with a driving handle.

In testimony whereof I affix my signature.

GIUSEPPE GIOVANNI BATTISTA TARTARA.